Aug. 5, 1969     S. H. UPDIKE ET AL     3,459,166
VALVE SPRING RETAINER AND VALVE STEM OIL SHIELD
ASSEMBLY AND METHOD OF ASSEMBLY
Filed Aug. 18, 1967
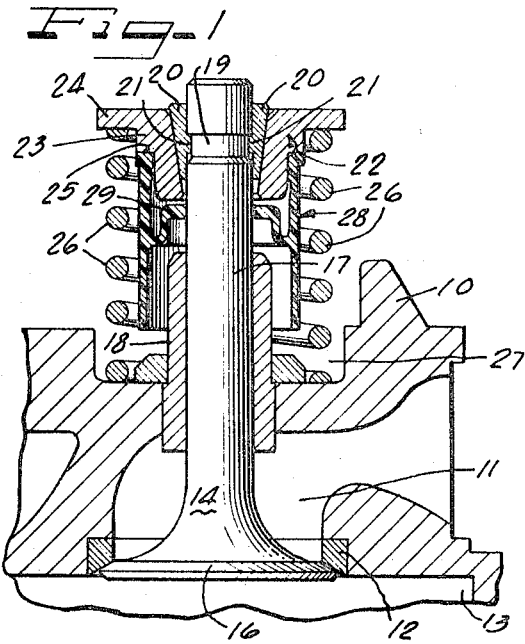
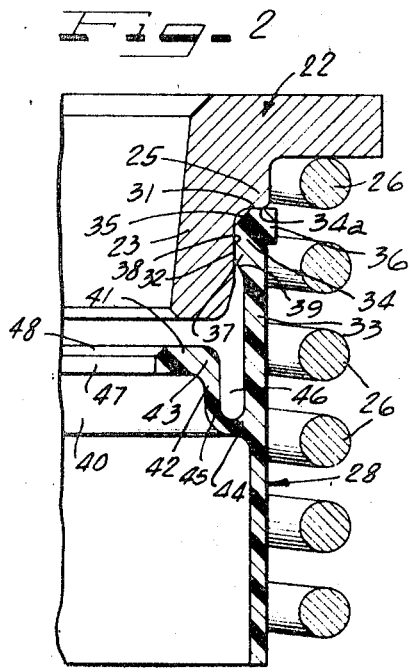
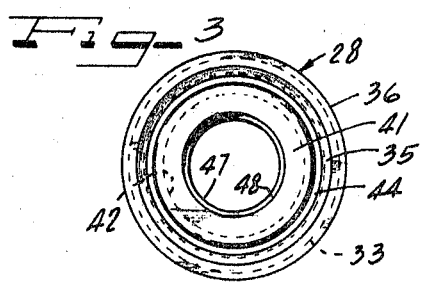
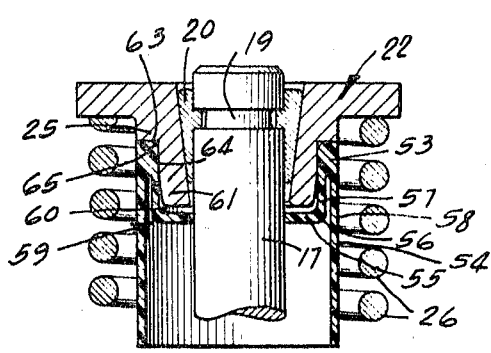
INVENTORS
STANLEY H. UPDIKE
WILLIAM A. MICHAELS
BY 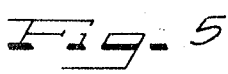
ATTORNEYS

United States Patent Office 3,459,166
Patented Aug. 5, 1969

3,459,166
VALVE SPRING RETAINER AND VALVE STEM OIL SHIELD ASSEMBLY AND METHOD OF ASSEMBLY
Stanley H. Updike, Mentor, and William A. Michaels, Warrensville Heights, Ohio, assignors to TRW Inc., Cleveland, Ohio, a corporation of Ohio
Filed Aug. 18, 1967, Ser. No. 661,606
Int. Cl. F01l *3/16;* F16k *41/10*
U.S. Cl. 123—188                                    8 Claims

ABSTRACT OF THE DISCLOSURE

A valve stem oil shield and seal bonded to a portion of the outer circumferential surface of a valve spring retainer by induction heating. The shield has an interior radial lip which sealingly engages the valve stem and is radially flexible but axially semi-rigid.

Field of the invention

BACKGROUND OF THE INVENTION

This invention relates to oil shields and more particularly to a one-piece thermoplastic oil shield and valve stem seal bonded to a valve stem retainer and adapted for use in connection with valve assemblies used in internal combustion engines. The invention provides a cylindrical oil shield which has an internal radial flexible lip adapted to sealingly engage the exterior circumferential surface of a valve stem through a large variance in concentricity between the valve spring retainer and the valve stem. The combination oil shield and valve stem seal is bonded to a portion of the external circumferential surface of a valve spring retainer by means of induction heating.

Prior art

The use of valve stem oil shields in connection with reciprocating valves in internal combustion engines is known to the art, as is the use of valve stem seals. Such prior art valve stem shields and seals are usually fastened to the valve spring retainer by means of an interference fit between the exterior circumferential surface of the shield and the interior circumferential surface of the valve spring retainer. When such a method is used, the valve spring retainer must be increased in axial length in order to provide space in which to anchor the shield below the retainer lock. This increases the height of the retainer to a point undesirable for use in many modern engines which emphasize low engine profile. Such a construction also adds increased weight to the retainer and increases the complexity of manufacturing such retainers.

In order to avoid some of these difficulties it is known to the art to fasten the valve stem shields to one exterior surfaces of the valve spring retainer by means of an interference fit between the exterior circumferential surface of the retainer and the interior circumferential surface of the shield. When such a method is utilized the interior of the shield must tightly engage the exterior of the retainer and the force created at the mating faces by such a press fit can cause the retainer to lift off of the shield during assembly. Such prior art methods are ineffective in that the methods of fastening do not hold or are expensive and hard to adapt to modern production methods.

The prior art valve stem oil seals are either constructed of a piece of material separate from the shield or if integral with the shield they do not readily adapt to variances in concentricity between the shield and the valve stem.

SUMMARY

This invention provides a one-piece combination oil shield and valve stem oil seal which is bonded to a valve spring retainer by induction heating. The shield of this invention consists of a cylindrical piece of thermoplastic material which has radial lips extending both radially inward and radially outward around one end of the ylinder. The axial length of the radially inward lip is greater than the axial length of the radially outward lip. A second radial lip is radially flexible and extends radially inward from the cylinder inner diameter to a central aperture having a diameter the equal to or less than the diameter of the valve stem.

The shield is then bonded to the cylindrical outside surface of a valve spring retainer at the lipped end of the shield. The bonding is effected by locally heating selected portions of the valve spring retainer and the lipped end of the oil shield by an induction field.

The oil shield of this invention may then be assembled on a valve stem of an internal combustion engine. After assembly the radially inner edges of the radially flexible lip will sealingly engage the circumferential surface of the valve stem. Because of the radial flexibility of the sealing lip, it is able to sealingly engage the valve stem around its entire circumference even if it is not concentric with the valve spring retainer or the cylindrial walls of the oil shield.

It is therefore an objet of this invention to provide a one-piece combination oil shield and valve stem oil seal for use in connection with the valves of an internal combustion engine.

It is a further object of this invention to provide a one-piece combination oil shield and valve stem oil seal attachable to the exterior of a valve spring retainer.

It is a further object of this invention to provide a one-piece combination oil shield and valve spring oil seal attached to the exterior surface of a valve spring retainer and having a radially flexible valve stem oil seal portion.

It is a further and more specific object of this invention to provide a one-piece combination oil shield and valve stem oil seal attached to the exterior surface of a valve spring retainer and having a radially flexible interior valve stem oil seal portion which will accommodate a wide degree of variance in concentricity between the valve stem and the circumferential walls of the oil shield.

It is yet another and more specific object of this invention to provide a combination oil shield and valve stem oil seal which is bonded to the cylindrical exterior surface of a valve spring retainer.

It is yet another and more specific object of this invention to provide a one-piece combination oil shield and valve stem oil seal bonded to the exterior cylindrical surface of a valve spring retainer and having an interior radially flexible valve stem engaging portion which will accommodate variances in concentricity between the valve stem and the cylindrical walls of the combination oil shield and valve stem oil seal.

A still more specific object of this invention is to provide a one-piece combination oil shield and valve stem oil seal having an internal radially flexible valve stem engaging seal portion which will accommodate variance in concentricity between the valve stem and the cylindrical walls of the combination oil shield and valve stem oil seal and which is bonded to a valve spring retainer by induction heating of localized portions of the valve spring retainer and conduction heating of portions of the combination oil shield and valve stem oil seal.

BRIEF DESCRIPTION OF THE DRAWINGS

FIGURE 1 is a vertical sectional view taken through the head of an engine and illustrating a valve assembly employing an oil shield embodying the principles of the present invention;

FIGURE 2 is a fragmentary vertical expanded view taken through the upper end of a valve assembly with portions omitted and illustrating an oil shield embodying the principles of this invention;

FIGURE 3 is a top plan view of an oil shield embodying principles of this invention;

FIGURE 4 is a view similar to FIGURE 2 showing the manner in which the shield is bonded to the retainer;

FIGURE 5 is a fragmentary cross-sectional view of a valve assembly embodying a modified form of the invention.

DESCRIPTION OF THE PREFERRED EMBODIMENTS

FIGURE 1 illustrates a valve assembly for an internal combustion engine with the view showing portions of an engine head 10 in section. The head 10 has a valve port 11 therein. The valve port 11 has a valve seat 12 around a circumferential opening to a cylinder bore 13 of the internal combustion engine. The valve port 11 is closed by a poppet valve 14 which has a head portion 16 which may sealingly engage the valve seat 12. The poppet valve 14 has a relatively long stem portion 17 extending axially from the head portion 16. The stem 17 is slidably mounted in a valve stem guide 18 in the engine head 10.

At the upper end of the valve stem 17 an annular valve lock receiving groove 19 is provided. The groove receives a valve spring retainer lock 20 which has inwardly directed flanges 21 positioned in the groove 19 to hold the lock 20 in place on the stem 17. The lock 20 holds a valve spring retainer 22 circumferentially around the end of the valve stem 17.

The valve spring retainer 22 has a main body portion 23 with a radially outwardly directed flange 24 around the top and a shoulder 25 intermediate the top and bottom. A coil spring 26 surrounds the valve stem 17 with one end bottomed on the flange 24 of the valve spring retainer 22 and the other end seated in a bore 27 in the head 10 of the engine.

During operation of the engine, oil coming into contact with the valve stem 17 can flow down the sides of the stem through the valve stem guide 18 and be lost into either the valve port 11 or the cylinder 13. This loss of lubricating oil is undesirable from the standpoint of oil consumption. It is also desirable that the lubricating oil not find its way into the cylinders 13 or the valve port 11 where it can combine with the combustion gases of the engine and cause excessive smoking and carbon buildup. It is therefore desirable to maintain the oil on the valve stem 17 at the minimum required for effective lubrication.

For this purpose an oil shield 28 is provided circumferentially around the valve stem 17. The oil shield 28 is bonded at its top to the valve spring retainer 22 while its bottom is spaced from the head 10 of the engine so that the poppet valve 14 may reciprocate in the valve stem guide 18 without the bottom of the oil shield coming in contact with the head 10 of the engine. A valve stem oil seal lip 29 extends radially inward intermediate of the two ends of the oil shield 28 and circumferentially contacts the valve stem 17.

As shown in FIGURE 2, the shoulder 25 of the valve spring retainer 22 has a flat radial wall 31 and a straight axial wall 32. The main body portion 23 of the valve spring retainer is tapered radially inward axially below the straight axial wall 32.

The oil shield 28 is cylindrical and has an exterior wall 33. The exterior wall 33 has a wide end 34 which consists of a radially outwardly directed lip 36 and a radially inwardly directed lip 37. The radially inwardly directed lip 37 is axially longer than the radially outwardly directed lip 36.

The radially inwardly directed lip 37 has a flat axial face 38 which forms its inner circumference. The flat axial face 38 is tapered radially outward at its bottom 39. The bottom taper 39 extends back to the cylindrical wall 33. The axial wall 32 of the shoulder 25 has an axial length greater than the axial face 38 of the radially inward lip 37. The axial end face 34a of the wide end 34 of the oil shield 28 consists of the radial faces at the axial end of the lips 37 and 38.

The internal diameter of the radially inward lip 37 is preferably equal to or less than the external diameter of the spring retainer 22 at the axial face 32. The oil shield 28 is assembled onto the valve spring retainer 22 so that the widened end 34 abuts the shoulder 25 with the radially inwardly directed lip 37 tightly engaging the valve spring retainer 22. The axial face 38 of the lip 37 engages the axial face 32 of the shoulder 25 and the axial end face 34a of the widened end 34 of the oil shield 28 will engage the radial face 31 of the shoulder 25. The radially inner and axially outer edge of the wide end 34 may be chamfered to provide a circumferential air space 35 between the valve spring retainer 22 and the wide end 34 of the shield 28 at the intersection of the radial wall 31 and the axial wall 32 of the shoulder 25.

Because the internal diameter of the wide end 34 is the same as or less than the external diameter of the retainer at the axial wall 32 the shield and retainer will have a press fit relationship at the interface when assembled. The radially inward taper of the main body portion 23 of the retainer below the axial wall 32, the radially outward taper 39 of the bottom of the lip 37 and the flat axial interface between the axial face 38 and the longer axial wall 32 coact to prevent axial lift off of the retainer 22 from the shield 28 which might otherwise result from the force of the press fit relationship between the two.

The circumferential wall 33 of the oil seal 28 has a radially inwardly directed lip 40 intermediate of the two ends of the shield 28. The lip 40 has a radial flange portion 41 integral with the top of an axial portion 42 through a 90° angle 43. The axial portion 42 is integral with the flange 41 at the outer radial circumference of the flange portion 41. The bottom of the axial portion 42 is integral with a short radial portion 44 through an angled portion 45. The short radial portion 44 is in turn integral with the cylinder wall 33 of the oil shield 28.

It can therefore be seen that the radial lip 40 is of a one-piece construction with the oil shield 28 and is formed by a first portion extending radially inward from the cylindrical wall 33 of the oil shield 28 which is integrally connected to a second portion extending axially upward parallel to the cylindrical wall 33 of the oil shield 28, the second portion being integrally connected with a third radial portion extending radially inward. The third radial portion or flange 41 is separated from the cylinder wall 33 by a U-shaped air space 46 the legs of which are formed by the cylinder wall 33 and the axial portion 42 and the bight of which is formed by the short radial portion 44.

The lip 40 is axially semi-rigid radially flexible. The lip 40 is radially flexible through the angle 45. The angle 45 is normally a 90° angle which holds the axial portion 42 at right angles to the short radial portion 44 and parallel with the cylinder wall 33. However, the angle 45 is resiliently bendable into either an acute or an obtuse angle. In this manner the axis of the flange 41 may shift radially while the axis of the cylindrical shield 28 remains stationary so that the two are no longer concentric. The angle 43 is also resiliently bendable preferably to a lesser degree than the angle 45.

The radial flange 41 of the lip 40 has an inner peripheral edge 47 which may be chamfered at its upper corner 48 and which circumferentially sealingly engages the cylindrical surface of the valve stem 17.

The combination oil shield and valve stem seal 28 is bonded to the valve spring retainer at the interface of the axial face 38 of the wide end 34 of the oil shield 28 and the axial wall 32 of the shoulder 25 by localized induction heating.

As shown in FIGURE 4 after the combination oil shield and valve stem oil seal 28 is press fitted onto the valve spring retainer 22 at the shoulder 25, the combination spring retainer and oil shield is passed into the electrical field emanuating from a high frequency induction coil 50 and positioned therein in such a manner that the electrical field of the induction coil 50 will cause localized heating of the thermoplastic material of the combination oil shield and valve stem oil seal at the axial face 38 and the axial end face 34a of the wide end 34 at the points where they contact the radial face 31 and the axial face 32 of the shoulder 25.

Because the combination oil shield/seal is made of thermoplastic materials which are insulators to the electrical field of the induction coils, the heating of the oil shield seal is caused by conduction across the interfaces between the seal and the valve spring retainer. The heat paths in the retainer caused by the induction field are shown by the arrowed lines 51. The combination oil shield/seal is heated until its bonding point is exceeded but below the degradation point of the thermoplastic material. In practice thermoplastic materials such as nylon 6, nylon 6/6 and nylon 6/10 have been found to be acceptable. These materials have a bonding temperature 40 to 80° F. above their melting temperatures which are from 400 to 500° F.

Thermoplastic materials such as these are desirable because their resistance to heat conduction allows their surface to exceed the bonding temperature at the point of contact with the retainer without deep melting which would relieve the press fit relationship between the shield and the retainer. It is to be understood, however, that other thermoplastic materials may be used.

Because the combination shield/seal is heated only by conduction from the retainer, the points of the shield/seal in contact with the retainer will achieve bonding temperature without the press fit of the shield on the retainer being destroyed. Therefore, after the bonding temperature has been reached and the assembly is allowed to cool, the press fit between the oil shield/seal and the retainer will effectively bond the oil shield/seal to the retainer at the points of contact. The air gap 52 between the shield wall 33 and the retainer 22 axially below the lip 37 at the wide end 34 of the oil shield keeps the other portions of the shield located radially out from the bottom portions of the retainer 22 from coming in contact with the retainer 22 thereby preventing heating those portions of the oil shield/seal. The air gap 52 also aids in the cooling of the bonded interfaces after removal from the induction field. The air gap 53 left by the chamfered edge 55 also provides for heat insulation and prevents any distortion of the oil shield at its wide end.

FIGURE 5 illustrates another embodiment of the present invention. In this embodiment the flexible radial oil stem seal lip depends from the wide end 53 of the cylindrical oil shield 54. The radial seal stem engaging portion 55 of the valve stem seal has a curved portion 56 at its outer radial circumference which is integral with a horizontal portion 57 parallel with the cylindrical wall 58 of the shield 54. The horizontal portion 57 extends axially above the radial portion 55 and is integral with the wide end 53 of the shield 54.

The cylindrical wall 58 is also integral with the wide end 53. In cross-section the axial portion 57 and the cylindrical wall 58 can be viewed as being two legs of an upsidedown U with the wide end 53 of the shield 54 as the bight portion. The valve stem engaging portion 55 is radially flexible due to the cantilever construction of the lip portion and the resiliency of the thermoplastic material. The combination oil shield and valve stem oil seal 59 is bonded to the valve spring retainer 22 at the shoulder 25 by induction heating as hereinabove described. An air gap 60 is created between the combination oil shield and valve stem oil seal 59 and the bottom portion 61 of the retainer 22 by frusto-conically tapering the bottom portion of the retainer 22. In this embodiment the intersection of the radial face 63 and the axial face 64 of the shoulder is at substantially right angles and the inner circumferential edge 65 of the wide end 53 of the oil shield 54 is also a right angle. However, the edge 65 can be tapered so as to provide a radial air gap comparable to the air gap 53 in the embodiments shown in FIGURES 1, 2, 3, and 4.

In this embodiment the combination oil shield and valve stem oil seal is bonded to the retainer 22 in the manner described above in connection with FIGURE 4.

From the above description it will be understood that our invention provides a cylindrical thermoplastic oil shield with an integral radially inwardly directed flexible lip or flange having a central aperture for sealingly engaging the stem of a poppet valve of an internal combustion engine. The oil shield is bonded at one of its ends to a portion of the circumferential surface of a valve spring retainer cap by localized induction heating of the retainer cap and conduction heating of portions of the end of the oil shield. It will be further understood that the radial flexibility of the valve stem engaging lip or flange allows the lip or flange to sealingly engage the circumferential surface of the valve through a wide degree of variance in concentricity between the valve and the oil shield and valve spring retainer assembly.

From the foregoing it will be readily observed that numerous variations and modifications may be effected without departing from the true spirit and scope of the novel concepts and principles of the invention. We therefore, intend to cover all such modifications and variations as fall within the true spirit and scope of the novel concepts and principles of our invention.

We claim as our invention:

1. A one piece combination oil shield and valve stem oil seal for use with valve spring retainer assemblies in internal combustion engines which comprises: a tubular member having a radially inwardly projecting annular lip, said lip positioned intermediate the ends of said member, said lip having a central aperture for receiving a valve stem therethrough, said lip adapted to circumferentially engage the exterior surface of the valve stem at the inner circumference portion of the said lip, said inner circumference portion integral with said tubular member through an axial portion, said axial portion being integral with said tubular member and said inner circumference portion at axially displaced points, said lip being radially flexible relative to the tubular member to accommodate variances in concentricity between the valve stem and the wall of said tubular member while remaining in circumferential engagement relationship with the valve stem.

2. The combination of claim 1, wherein the tubular member is attached to the valve spring retainer at the outer circumference thereof and the annular lip is axially spaced from said retainer and movable relative thereto.

3. The combination of claim 2, wherein the tubular member is composed of thermoplastic material and is heat bonded to the retainer.

4. A one piece combination oil shield and valve stem oil seal for use in connection with valve spring retainer assemblies in internal combustion engines which comprises: a tubular member having a radially inward extending portion at one end thereof and a seal lip projecting radially inwardly of the tube wall positioned intermediate of the axial ends of said tube, said seal lip adapted to circumferentially engage a valve stem positioned within said cylinder, said seal lip integral with said tubular member through an axial portion connected to said lip and tubular member at axially displaced points and said lip being flexible sufficiently to allow the said lip to move radially independently of the said tubular member whereby the said lip is radially flexible to accommodate variances in concentricity between said valve stem and said tubular member without destroying the circumferential engaged relationship between said seal lip and said valve stem positioned within said cylinder, the inner circumference of the said radially inward extending portion at one end of the said tubular member engaging a circumferential portion of the valve spring retainer whereby said combination oil shield and valve stem oil seal is attached to said valve spring retainer around its outer circumference, and said tubular member extending axially beyond said valve spring retainer to position the lip in spaced relation from the retainer.

5. The method of bonding an oil shield to a valve spring retainer which comprises:

assembling a tubular thermoplastic oil shield on a metal valve spring retainer with a first portion of the interior surface of the said oil shield engaging a portion of the interior surface of the said retainer, introducing the assembly to the field of a high frequency induction coil and heating the said retainer by induction, heating the retainer engaging surfaces of the said first portion of the said oil shield by conduction from the said heated retainer beyond the bonding temperature of the said thermoplastic material of the said shield, and cooling the assembly below the said bonding temperature.

6. The method of bonding a combination tubular oil shield and flexible valve stem oil seal to a valve spring retainer for use in connection with a reciprocating valve which comprises:

press fitting an end portion of the combination oil shield and valve stem oil seal circumferentially onto a portion of the exterior surface of the retainer, providing an air gap between the interior surface of the portion of the combination oil shield and valve stem oil seal axially adjacent the said end portion and the exterior surface of the said retainer, introducing the combination oil shield and valve stem oil seal and the retainer in their press fitted condition to the field of a high frequency induction coil, heating the said retainer by induction, heating the portions of the said end portion of the said combination oil shield and valve stem oil seal which engage the said retainer by conduction from the said heated retainer beyond the bonding temperature of the material of the said combination oil shield and valve stem oil seal without destroying the press fit relationship between the said combination and the said retainer, and cooling the said combination oil shield and valve stem oil seal and the retainer below the said bonding temperature.

7. A one piece combination cylindrical oil shield and flexible valve stem oil seal for use in connection with valve assemblies having valve spring retainer caps which comprises: a thermoplastic cylinder, the end portion of at least one of the ends of said cylinder having an interior diameter less than the interior diameter of the portion of the cylinder axially adjacent said end portion, said small diameter end portion press fitted onto a circumferential portion of the exterior surface of a valve spring retainer cap and bonded thereto, a radially inwardly directed annular flange integral with said cylinder, said annular flange positioned intermediate of the ends of said cylinder, said flange having a central aperture for sealingly engaging the external circumferential surface of a valve stem positioned within said cylinder, said aperture bordered by a central ring section defining the said aperture, said ring section integral with the said cylinder through a substantially axially extending cylindrical portion which is integral with the ring portion through a bend portion and integral with the cylinder through a connecting portion, the combination of the connecting portion being axially displaced along the axially extending cylindrical portion from the bend portion, said bend portion being sufficiently flexible so as to allow the ring portion to shift radially with respect to the axis of the cylinder whereby said flange is radially flexible and accommodating variances in concentricity between the said valve stem and the said cylinder while remaining in circumferential engaged relationship with the surface of the said valve stem.

8. The combination of claim 7, wherein the annular flange depends from the small diameter end portion.

References Cited

UNITED STATES PATENTS

| | | | |
|---|---|---|---|
| 2,753,008 | 7/1956 | Peirce | 277—178 X |
| 2,822,796 | 2/1958 | Niess. | |
| 3,110,298 | 11/1963 | Giles. | |
| 3,171,659 | 3/1965 | Anderson et al. | 277—33 |
| 3,333,578 | 8/1967 | Muller. | |
| 3,369,819 | 2/1968 | Soo | 277—178 |

AL LAWRENCE SMITH, Primary Examiner

U.S. Cl. X.R.
277—1, 33, 178